June 14, 1960   H. H. MOODY   2,941,184
METHOD FOR PLOTTING SEISMIC DATA
Filed April 27, 1956   3 Sheets-Sheet 2
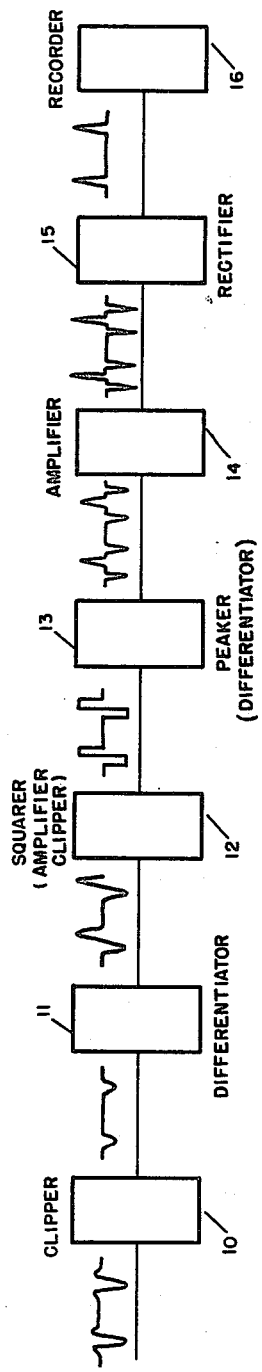
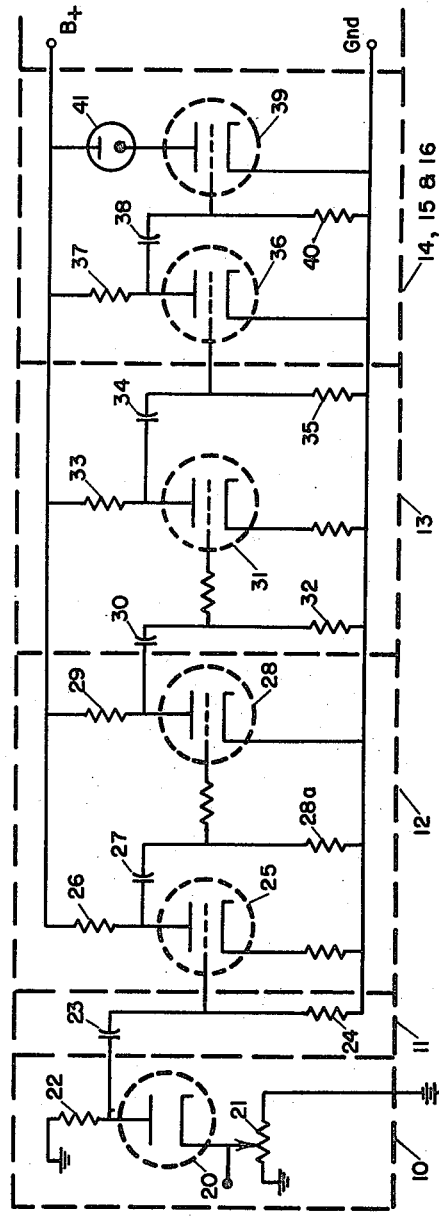
HERBERT H. MOODY
INVENTOR.
BY *Jerry J. Dunlap*
ATTORNEY June 14, 1960  H. H. MOODY  2,941,184
METHOD FOR PLOTTING SEISMIC DATA
Filed April 27, 1956  3 Sheets-Sheet 3

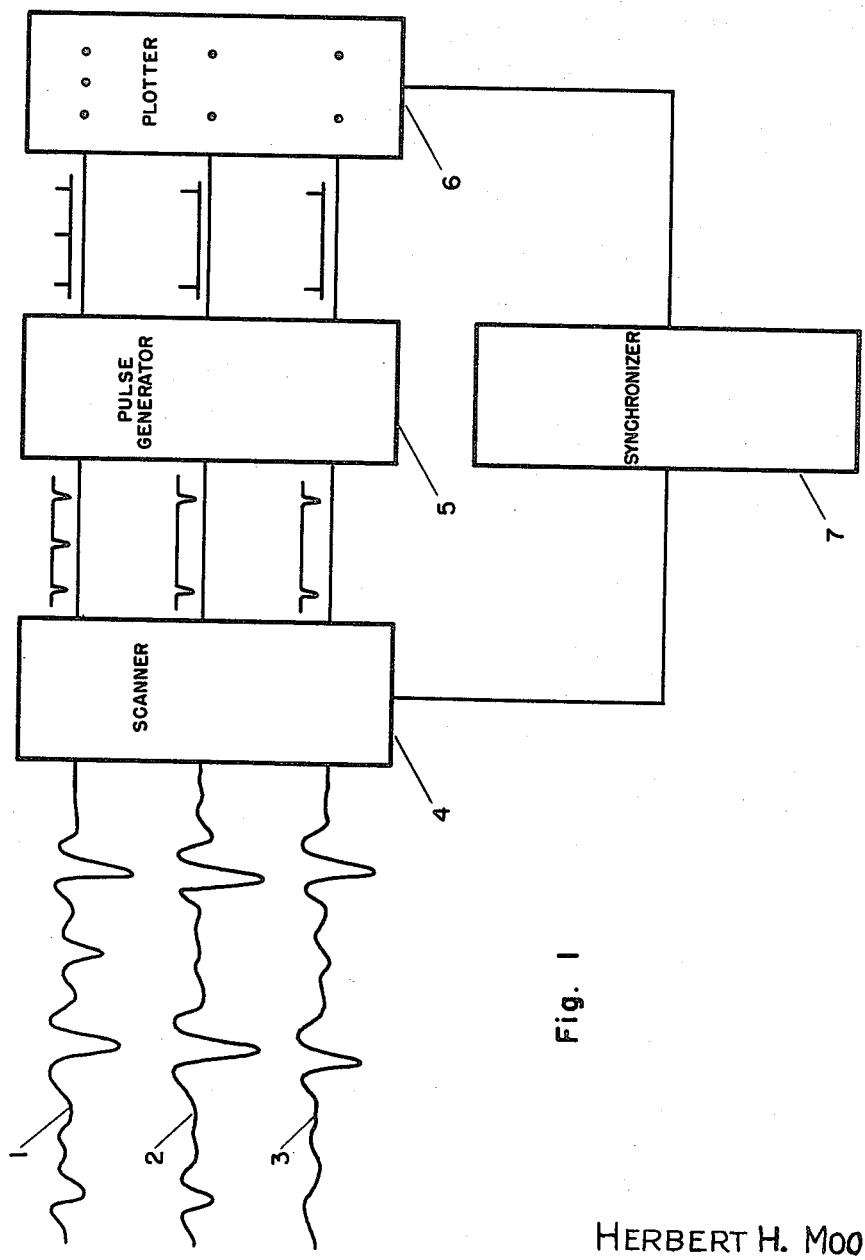

HERBERT H. MOODY
INVENTOR

BY *Jerry J. Dunlap*
ATTORNEY

United States Patent Office 2,941,184
Patented June 14, 1960

2,941,184

METHOD FOR PLOTTING SEISMIC DATA

Herbert H. Moody, Ponca City, Okla., assignor to Continental Oil Company, Ponca City, Okla., a corporation of Delaware Filed Apr. 27, 1956, Ser. No. 581,046

8 Claims. (Cl. 340—15)

This invention relates generally to improvements in the art of seismic prospecting, and more particularly, but not by way of limitation, to a method and apparatus for transferring seismic data from a seismogram to a time or depth section.

As it is well known in the art of seismic prospecting, the seismic energy generated by a source in a local area and reflected and refracted by subsurface strata is picked-up at the surface by one or more detectors which convert the seismic energy returning to the earth's surface to electrical representations of the seismic energy. Generally speaking, the electrical variations produced by the detectors are recorded by magnetic or optical means onto a record which will contain several traces representative of the electrical variations. For the purpose of this specification and the appended claims, and as is common in the art, the word "seismogram" shall refer either to the electrical variations produced by the detectors or reproduced from the recorded traces, or a record which contains a series of traces which are in turn representative of the electrical variations produced by detectors. In other words, a "seismogram" is a visual or electrical representation of the movement of the earth's surface at two or more points.

In order to use the information contained in a seismogram, selected portions of the seismogram (which are indicative of subsurface structural features) must be transferred to a visual schematic representation on graph paper. These schematic representations are commonly referred to as time or depth sections. At the present time this transfer is made manually and requires a substantial length of time. The manual transfer is also tedious and is subject to numerous errors, thereby becoming the bottleneck and limiting the efficiency of seismic exploration. A large portion of the time of the computing personnel is spent on this routine work, whereas their time could be more profitably used in interpretation work.

An important object of this invention is to increase the efficiency of seismic exploration, and particularly in the operation of forming time or depth sections from seismograms.

Another object of this invention is to automatically transfer selected portions of a seismogram to a plotted form representing an earth cross section.

A further object of this invention is to provide a method of automatically forming a visual representation of subsurface configurations which influence the transmission of seismic energy directly from a seismogram.

A still further object of this invention is to eliminate the errors normally made in transferring information from a seismogram to a time or depth section.

Another object of this invention is to provide a simple and inexpensive apparatus for transferring information from a seismogram to a time or depth section.

Other objects and advantages of the invention will be evident from the following detailed description, when read in conjunction with the accompanying drawings which illustrate my invention.

In the drawings:

Figure 1 is a block diagram representing the basic concept of this invention.

Figure 2 is a diagrammatic representation of a preferred embodiment of this invention.

Figure 3 is a schematic wiring diagram of one assembly of apparatus which may be used in the embodiment illustrated in Fig. 2.

Figure 4:
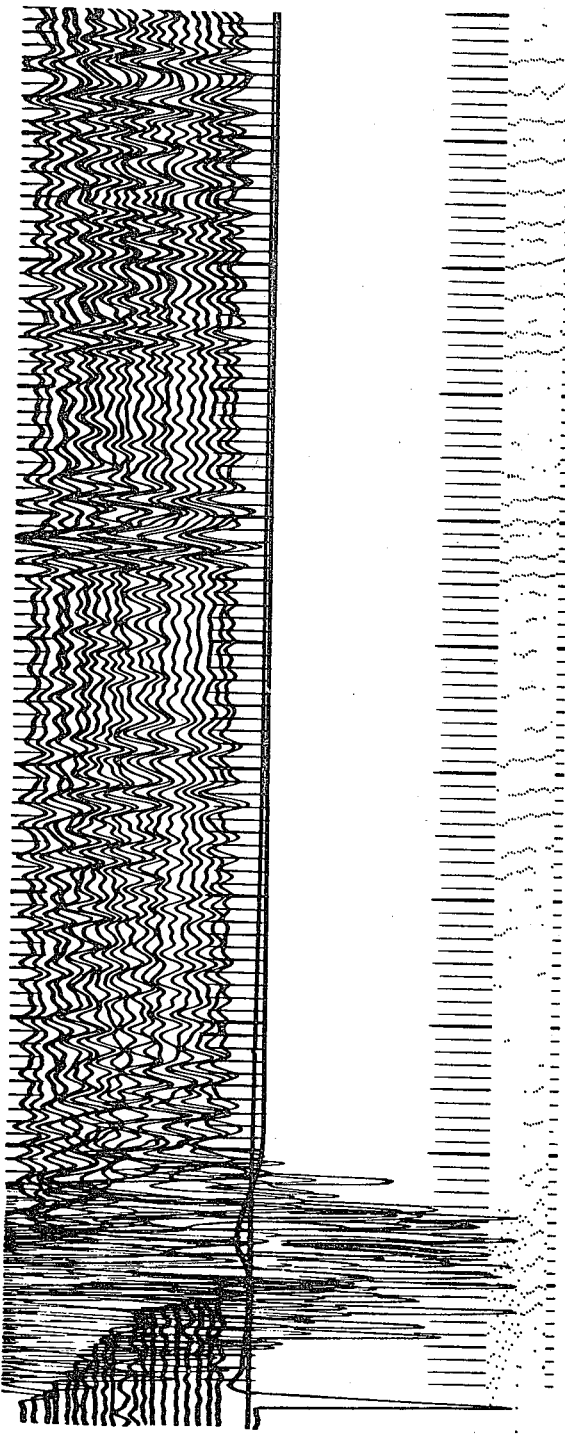
Figure 4 is a reproduction of a portion of an actual seismogram and time section produced by apparatus of the type shown in Fig. 3.

Broadly stated, the present invention may be defined as the method of forming a visual representation of subsurface structures which influence the transmission of seismic energy from a local area to a plurality of spaced reception points in a remote area which comprises:

(a) Producing an electrical seismogram of the energy received at said reception points, (b) Scanning the traces of said seismogram, (c) Generating an electrical pulse each time the same predetermined condition is encountered by said scanning operation, and (d) Forming a second record of visual representations respectively representative of said pulses, said visual representations bearing a relation to each other which is a function of the time relation between the conditions in said traces which gave rise to said pulses.

Referring to the drawings in detail, and particularly Fig. 1, reference characters 1, 2, and 3 designate portions of three seismic traces schematically representative of a seismogram. It will be understood that an actual seismogram contains many more traces, with the traces being of longer duration. As previously indicated, these seismic traces are obtained from the output of seismic wave detectors located at various points on the surface of the ground, and represent the seismic energy reaching the detectors after generation of the seismic energy at a properly located point. The traces 1, 2, and 3 are reprensentations (either electrical or recorded) of the electrical variations produced by the various detectors (properly amplified and filtered) after the initiation of seismic energy. For the purpose of my invention, these electrical variations may be used as they are produced by the detectors, or they may be recorded and reproduced in electrical form at a later time.

It should also be noted that the traces 1, 2, and 3 may be corrected for geometrical differences in length of path (removal of step-out time) and for differences in elevation and thickness of the weathered zone, as is common in the art. These corrections are usually made during reproduction of a seismogram, and the corrected signals (or traces) are used in the production of a time or depth section. Such correcting methods, as well as the apparatus employed, are well known in the art and are therefore not described or shown in detail herein. It may be assumed that these corrections have been applied to the traces 1, 2 and 3.

The traces 1, 2, and 3 contain a substantially unlimited amount of information regarding the subsurface strata through which the seismic energy has been propagated. However, in the present state of the art, only certain portions of the traces may be interpreted. In discriminating between the interpretable features of seismic traces, the most important criteria used (in their order of decreasing importance) are: amplitude, phase correspondence and shape (sometimes called character). In the present invention, any desired criterion may be used to discriminate between portions of the traces. However, amplitude considerations provide the simplest and preferred criterion. Therefore, this description of the invention is principally devoted to the amplitude criterion.

In the broader aspects of this invention, the traces 1, 2, and 3 are scanned by a device 4 which inspects each of the traces and selects portions of the traces on the basis of the desired criterion. The selected portions are then used to initiate an electrical pulse, as by tripping a pulse generator 5, and the pulse is transferred into a visual representation by a plotter device 6. The plotter 6 and the scanner 4 are synchronized by any suitable device 7, in order that the visual representations of the pulses which are produced by the plotter will bear a relation to each other which is a function of the time relation between the conditions in the traces which give rise to the pulses.

When the discrimination between selected portions of the traces is based upon amplitude considerations, I prefer to use the system diagrammatically represented in Fig. 2. The curves between the different portions of the apparatus illustrated in Fig. 2 represent the successive electrical signal shapes resulting from the effect of the apparatus on the electrical representation of each of the three original seismic traces.

When using the apparatus of Fig. 2, an electrical signal generated from a seismic trace is first fed to a clipper 10 where only the portions of the signal which exceed a predetermined maximum or minimum amplitude are transferred to a differentiator 11. At the output of the differentiator 11, the selected portions of the trace appear as pulses of opposed polarities, with the zero at the instant of polarity change of each pulse corresponding to the time of occurrence of the respective minimum or maximum amplitude of the original signal.

The pulses provided by the differentiator 11 are fed to a squarer 12 which changes the sharp pulses to square pulses. When the square pulses are differentiated in a peaker 13, the square pulses become a sequence of three sharp pulses of alternating polarity in which the center pulse is indicative of the minimum or maximum amplitude of the original signal. The sharp pulses produced by the peaker 13, are then amplified in an amplifier 14 and rectified by a rectifier 15 to eliminate the two side pulses. The remaining center pulse is indicative of the precise time of occurrence of the minimum or maximum amplitude in the original signal. This pulse is then applied to a glow lamp or the like of a recorder 16.

The light from the glow lamp is focused on a recording medium for producing a visual representation upon the occurrence of each pulse supplied to the recorder 16. The recording medium of the recorder 16 is displaced in synchronism with the generation of the original signal when a time section is desired, and the recording medium is displaced at a rate which is a predetermined function of time when a depth section is desired.

In reviewing the operation of the apparatus shown in Fig. 2, it will be observed that the clipper 10 performs the functions of scanning an original signal and selecting only those portions of the original signal which exceed a predetermined amplitude. The differentiator 11, squarer 12, peaker 13, amplifier 14, and rectifier 15, are employed to convert each portion of the signal furnished by the clipper 10 into a sharp electrical pulse representing the precise time that the amplitude of the original signal reaches a maximum value. The sharp pulse energizes the recorder 16 to produce a visual representation upon the occurrence of each of the pulses. The recording medium used in the recorder 16 may be driven in synchronism with the feeding of the original signal to the clipper 10 to provide a time section, or the recording medium may be driven at a speed which is related to the original signal for producing a depth section.

A more detailed illustration of apparatus which may be employed in the method of this invention is shown in Fig. 3. The original signal which is produced either by a detector or reproduced from a recorded trace of a seismogram is applied to the cathode of the diode 20. The bias of the cathode may be adjusted by sliding a potentiometer arm 21 over a biasing resistance. The anode of the diode 20 is connected to ground through a resistance 22. When the cathode is driven by the original signal to a negative potential compared to ground, the diode 20 is conducting, and a potential drop results in resistance 22.

This potential drop is applied to a differentiating circuit comprising a condenser 23, and a resistor 24 through which the condenser 23 discharges. The time constant of this circuit (condenser 23 and resistor 24) is smaller than the shorter period of the frequency components present in the signal which has to be differentiated. Thus, electrical variations appearing across the resistor 24 are representative of the time derivative of the electrical variations applied to the condenser 23.

These differentiated electrical variations are applied to the grid of a triode 25 for amplification, and appear across the plate load resistor 26. The amplified signals are in turn applied through a condenser 27 to the grid of a triode 28 biased by a resistor 28a.

Triode 28 is selected and operated in such a manner that the electrical variations applied to its grid drive the tube to cut-off and saturation, thereby squaring the shape of the variations. For example, one side of a 12AU7 tube with 0 bias will operate in these conditions when 5 r.m.s. volts electrical variations are applied to its grid.

The squared electrical variations appear across the load resistor 29 and are applied through a condenser 30 to the grid of a tube 31 biased by a resistor 32. The signals applied to the tube 31 are amplified and, if necessary, further squared by cutoff and saturation, as described above. The squared electrical variations appearing across the plate resistor 33 of the tube 31 are applied to a differentiating circuit comprising a condenser 34 and a discharge resistor 35. Again, the time constant of this circuit is very short and preferably smaller than one tenth of the smallest period of interest present in the signal which is differentiated. Therefore, the electrical variations appearing across the resistor 35 are sharp spikes of alternating polarities.

The variations appearing across the resistor 35 are applied to the grid of a tube 36, where they are amplified and appear across the plate resistor 37. After amplification, the variations are transmitted through a condenser 38 to the grid of a power beam amplifier tube 39 biased by a resistor 40. This power tube must have the ability to drive a glow tube 41 placed in its plate circuit. The glow tube must produce enough light to be able, after focusing, to create a spot on a sensitized recording medium (not shown). For example, a tube such as a R1130B (gas discharge tube) has been found convenient, producing the necessary light during the few microseconds duration of each pulse.

The light from the gas tube 41 may be focused to a spot or short line segment by means well known in the art of seismic recording, and thereby projected upon photographic or other sensitive recording material. As previously indicated, the recording material is displaced at a constant rate of speed properly related to the frequency range of interest of the original signal, if a time representation is desired, or moved at a varying rate of speed depending on the relation between velocity and reflection time or depth if a depth section is desired to be plotted.

The recorder used in this invention may be a standard seismic camera with proper mechanical and optical configurations, such that the selected portions of a plurality of traces (corresponding to the seismic signals produced by detectors placed on the ground in their usual spatial relationship) may be represented by adjacent dots or short line segments on the photographic record.

In order to facilitate the correlation of the detailed circuitry of Fig. 3 with the block diagram of Fig. 2, I have shown dotted lines around the portions of Fig. 3 which functionally correspond to the elements of Fig. 2. It will thus be seen that the diode 20 circuit corresponds to the clipper 10, and the differentiating circuit comprising the condenser 23 and resistor 24 correspond to the differentiator 11. The tubes 25 and 28, along with their circuitry, perform the function of the squarer 12. Tube 31, with its various condensers and resistors, performs the function of the peaker 13. Finally, the tubes 36 and 39, and glow tube 41 correspond to the amplifier 14, rectifier 15 and recorder 16, with the exception of a recording medium and associated controls which would be required in the recorder 16.

Fig. 4 is representative of a portion of a time section obtained by means of the apparatus shown in Figures 2 and 3. In the top portion of Figure 4 the early part of a normal twenty trace seismic record or seismogram is shown. The first arrivals of seismic energy reaching the successive detectors are noticeable in the early portion of the traces, as well as a plurality of reflection arrivals spaced along the record and separated by lower amplitude variations of no value for the structural interpretation of this record.

On the lower portion of Figure 4, the new automatically plotted portion of the time section corresponding to this seismic record is shown. Each trace of the record has been replaced by a sequence of linearly arranged dots. The position of the dots along the length of the section is indicative of the time of their occurrence after the initiation of seismic energy. The dots in the individual lines of dots extending generally transversely across the section are arranged an equal distance apart in the order corresponding to the arrangement of the traces on the record and to the spatial arrangement of the detectors on the ground. Only the portions of the traces reaching a predetermined amplitude are represented on the time section. The dots representing these portions are located at the positions (along the length of the section) corresponding to the exact time of maximum amplitude of the original signal produced by each detector, and at positions (along the width of the section) corresponding to the spatial distribution of the detectors.

As stated above, criteria other than amplitude considerations could have been used. Persons skilled in the art of seismic prospecting know that phase relationship between successive traces also carries great interpretational significance. If such a criterion is desired to be used, it is a simple matter to control the generation of the electrical pulses by time coincidence circuits controlled by the determined criterion. For instance, if a simultaneous slope reversal of adjacent traces is considered a determining criterion, circuits are designed to generate pulses at the phase reversals of each trace, and the pulses derived from adjacent traces control a coincidence circuit which generates another pulse when the first pulses occur simultaneously. Many other schemes of electronic circuitry are available to those skilled in the art for the realization of the control of the generation of the flashing pulses on the occurrence of a predetermined condition during the scanning operation.

From the foregoing it will be apparent that the present invention eliminates many of the errors presently encountered in transferring information from a seismogram to a time or depth section. When the discrimination of selected portions of the seismogram traces is based on amplitude considerations, the present invention provides a visual representation each time the amplitude of any trace exceeds a predetermined value. The visual representations can then be studied to determine the characteristics of the subsurface strata through which seismic energy has been propagated. It will also be apparent that selected portions of seismogram traces are automatically transferred to visual representations by the present invention. The efficiency of seismic prospecting will be increased.

Changes may be made in the combination and arrangement of steps and elements as heretofore set forth in this specification and shown in the drawings, it being understood that changes may be made in the precise embodiments shown and described without departing from the spirit and scope of the invention as set forth in the following claims.

I claim:

1. (1) The method of forming a visual representation of subsurface structures which influence the transmission of seismic energy from a local area to a plurality of spaced reception points in a remote area which comprises:

(a) Producing an electrical seismogram of the energy received at each of said reception points, (b) Simultaneously scanning at least two of the traces of said seismogram, (c) Generating an electrical pulse each time the same predetermined condition occurs simultaneously in each of at least two of said traces, and (d) Forming a second record of visual representations respectively representative of said pulses, said visual representations bearing a relation to each other which is a function of the time relation between the conditions in said traces which gave rise to said pulses.

2. The method defined in claim 1 characterized further in that said predetermined condition is based on the amplitude of the traces.

3. The method defined in claim 2 characterized further in that said predetermined condition is based on slope reversal in each of said traces.

4. A method of forming a visual representation of subsurface structures which influence the transmission of seismic energy from a local area to a reception point in a remote area which comprises:

(a) Producing a time-varying electrical representation of the energy received at the reception point, (b) Clipping said electrical representation to select and retain only the portions of said electrical representation which exceed a predetermined amplitude, (c) Using said selected portions of electrical representation to control generation of sharp electrical pulses, and (d) Forming permanent visual representations of said pulses, wherein said visual representations bear a relation to one another which is a function of the time relation between the amplitudes of said electrical representation which gave rise to said pulses.

5. The method defined in claim 4 characterized further in that the visual representations are a series of dots on the second record.

6. The method defined in claim 5 characterized further in that the dots are arranged in the form of a time section representing the travel time of the seismic energy.

7. The method defined in claim 5 characterized further in that the dots are arranged in the form of a depth section representing the geological structure which influenced the transmission of the seismic energy.

8. A method of forming a visual representation of subsurface structures which influence the transmission of seismic energy from a local area to a reception point in a remote area which comprises:

(a) Producing a time-varying electrical representation of the energy received at the reception point, (b) Clipping said electrical representation to select and retain only the portions of said electrical representation which exceed a predetermined amplitude, whereby a series of time-spaced electrical pulses are produced.

(c) Differentiating said pulses to provide an alternating signal representative of each pulse, (d) Squaring said alternating signals, (e) Differentiating the squared signals, (f) Rectifying the differentiated signals to retain only the electrical pulse representative of the time of occurrence of the maximum amplitude of each of the first-mentioned pulses, and (g) Forming permanent visual representations of the last-mentioned pulses, with said visual representations bearing a relation to one another which is a function of the time relation of the last-mentioned pulses.

References Cited in the file of this patent

UNITED STATES PATENTS

| | | |
|---|---|---|
| 2,304,740 | Minton | Dec. 8, 1942 |
| 2,364,209 | Green | Dec. 5, 1944 |
| 2,425,600 | Coykendall | Aug. 12, 1947 |
| 2,767,388 | Rust | Oct. 16, 1956 |
| 2,791,288 | Meier | May 7, 1957 |